(12) United States Patent
Tsang et al.

(10) Patent No.: US 6,813,729 B1
(45) Date of Patent: Nov. 2, 2004

(54) PROGRAMMABLE BI-DIRECTIONAL MII TESTING METHODOLOGY AND DEVICE INCLUDING SAME

(75) Inventors: Oikwan Tsang, San Jose, CA (US); Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 756 days.

(21) Appl. No.: 09/595,039

(22) Filed: Jun. 15, 2000

(51) Int. Cl.[7] ................................................ G06F 11/00
(52) U.S. Cl. ............................................ 714/43; 712/39
(58) Field of Search ............................. 714/43, 44, 25, 714/27, 30, 31, 37, 45, 56; 712/29, 39, 40, 43; 710/8, 130, 11; 370/351, 352

(56) References Cited

U.S. PATENT DOCUMENTS

| | | | | |
|---|---|---|---|---|
| 4,897,874 A | * | 1/1990 | Lidinsky et al. ............. 713/201 |
| 5,361,261 A | | 11/1994 | Edem et al. | |
| 5,465,364 A | | 11/1995 | Lathrop et al. | |
| 5,548,731 A | | 8/1996 | Chang et al. | |
| 5,606,559 A | | 2/1997 | Badger et al. | |
| 5,784,573 A | | 7/1998 | Szczepanek et al. | |
| 5,802,073 A | | 9/1998 | Platt | |
| 5,838,989 A | * | 11/1998 | Hutchison et al. ............. 710/11 |
| 5,892,768 A | | 4/1999 | Jeng | |
| 5,963,595 A | | 10/1999 | Graham et al. | |
| 5,974,051 A | | 10/1999 | De Nicolo et al. | |
| 5,978,853 A | | 11/1999 | Crayford et al. | |
| 5,991,305 A | * | 11/1999 | Simmons et al. ........... 370/422 |
| 5,995,514 A | | 11/1999 | Lo | |
| 6,011,799 A | | 1/2000 | Kerstein et al. | |
| 6,128,310 A | * | 10/2000 | Chow et al. ................. 370/448 |
| 6,169,742 B1 | * | 1/2001 | Chow et al. ................. 370/402 |
| 6,223,305 B1 | * | 4/2001 | Simmons et al. ............. 714/34 |
| 6,236,643 B1 | * | 5/2001 | Kerstein ..................... 370/254 |
| 6,393,548 B1 | * | 5/2002 | Kerstein et al. .............. 712/43 |

* cited by examiner

Primary Examiner—Dieu-Minh Le
(74) Attorney, Agent, or Firm—Renner, Otto, Boisselle & Sklar, LLP

(57) ABSTRACT

The network interface device has multiple blocks having internal connections, and has an external interface. The network interface device is configurable to reroute one or more of the internal connections onto the external interface to allow testing of the blocks of the device. The external interface may also be coupled so as to pass data between the network interface device and higher levels in a network protocol stack. In an exemplary embodiment a network interface device has a media access controller (MAC) and a physical layer device (PHY). An internal media independent interface (MII) between the MAC and the PHY may be selectively rerouted to an external MII for independently testing operation of either the MAC or the PHY.

28 Claims, 5 Drawing Sheets

PROGRAMMABLE BI-DIRECTIONAL MII TESTING METHODOLOGY AND DEVICE INCLUDING SAME

BACKGROUND OF THE INVENTION

1. Technical Field of the Invention

The present invention generally relates to methods and structures for testing network interface devices.

2. Description of the Related Art

Network interfaces for connecting a device, such as a computer, to a network, commonly include a media access controller ("MAC") and a physical layer device ("PHY" or "PHY device"). The MAC insures that data being sent is properly formatted and dressed, so that frames or packets of data are properly recognized by other devices on the network. Signals from the MAC are sent to the PHY which handles the actual transmission of signals on a network medium. The network medium may be any of a variety of well known media, such as fiber-optic cables or various types of dedicated metal-wire cables such as twisted shielded pair, 10 BASE-T, and wiring for telephone lines. Alternatively, the network medium may include wireless communication. During the manufacture of network interface components or devices, such as the PHY and MAC devices described above, the components are tested at various stages of the process. Manufacturers have significant economic inventive to detect and discard faulty components as early in the manufacturing process as possible.

In evaluating the performance of a device it is desirable to be able to independently test the internal blocks of the device. Prior devices have utilized additional dedicated pins to facilitate such testing. However, it will be appreciated that the use of dedicated pins for testing internal components may increase product cost, size, and complexity.

Accordingly, it will be appreciated that it would be desirable to have network interface devices and methods for testing such devices which overcome the aforesaid disadvantages.

SUMMARY OF THE INVENTION

The network interface device has an external interface and multiple blocks of operative components, pairs of the blocks having internal connections between them. The network interface device is configurable to reroute one or to more of the internal connections onto the external interface to allow testing of the blocks of the device. The external interface may also be coupled so as to pass data between the network interface device and higher levels in a network protocol stack. In an exemplary embodiment a network interface device has a media access controller (MAC) and a physical layer device (PHY). An internal (media independent interface (MII) between the MAC and the PHY may be selectively rerouted to an external MII for independently testing operation of either the MAC or the PHY.

According to an aspect of the invention, a network interface device has multiple blocks with internal connections, one or more of the internal connections being selectively reroutable to an external interface of the network interface device.

According to another aspect of the invention, a method of testing internal blocks of a network interface device includes rerouting one or more internal connections of the network interface device to an external interface of the device.

According to yet another aspect of the invention, a network interface device includes a MAC, a PHY, and a switchable connection between the MAC and the PHY for re-routing all or part of the interface to an external interface of the device.

According to still another aspect of the invention, a network interface device includes an external media independent interface (MuI), the MuI being usable in normal operation to interface with devices on a higher level in a network protocol stack, and being usable to test operation of individual blocks of the device.

According to a further aspect of the invention, a network medium interface includes first and second blocks, an external interface, and a switchable connection, wherein the switchable connection may be selectively configured either to internally connect the blocks to each other, or to connect one of the blocks to a transmit portion and/or a receive portion of the external interface.

According to a still further aspect of the invention, a method of testing operation of an internal block of a network medium interface includes the steps of reconfiguring the device so that a normally-internally-connected connection of the block are connected to an external interface; inputting test signals to the block; and evaluating output of the block.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

As described below, a network medium interface device includes an external interface, such as a media independent interface (MII), which may be used in normal operation for passing data to and from the network medium interface device. The network medium interface device may also be configured in one or more test modes. The test mode configurations enable the external interface to transmit data to and/or receive data from normally-internally-connected blocks of the network medium interface device. The network medium interface device includes one or more switchable connections for allowing internal connection of blocks of the network medium interface device, or for allowing connection of the blocks to the external interface during test mode operation.

Figure 1:
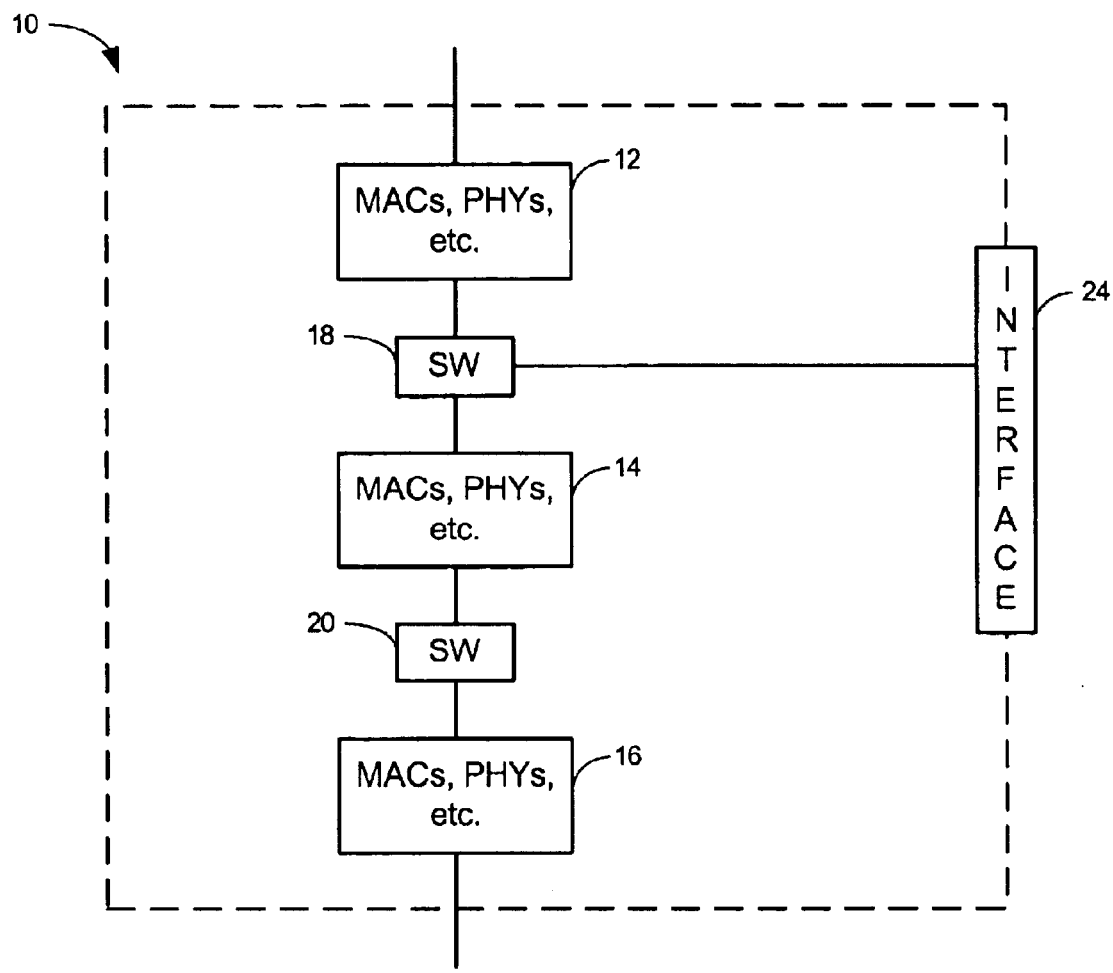
FIG. 1 is a block diagram of a network interface device in accordance with the present invention.

FIG. 1 shows a conceptual diagram of a network medium interface device 10 of the present invention. The interface device 10 includes blocks 12, 14, and 16, as well as switchable internal connections 18 and 20. The blocks 12, 14, and 16 may include devices such as physical layer devices (PHYs) and media access controllers (MACs). They also may include state machines, control logic, data registers, FIFOs, and hardware for interfacing within a network stack. Such interfacing hardware may include hardware for interfacing with a network medium such as twisted shielded wire, fiber optic cable, or telephone lines. Such hardware may include an analog front end (AFE) and magnetics for sending and receiving signals along a network medium. The blocks may also include hardware for making connections to devices at higher layers of a network protocol stack.

The network interface device 10 also includes an external interface 24 which may be used in normal operation to pass data between one or more of the internal blocks 12, 14, and 16 and a higher-level device and/or driver which is coupled to the external interface 24. The network interface device 10 may also be configurable, via configuration of the switchable internal connections 18 and 20, to enter one or more test modes in which one or more of the normally-internal connections between the blocks 12, 14, and 16, are rerouted to the transmit and/or receive portions of the external interface 24. This test mode rerouting allows testing of the operation of one or more of the blocks 12, 14, and 16. The flexibility of the external interface 24, which as indicated above may be used both in normal operation and in test mode operation, allows the network interface device 10 to be produced with fewer pins. This may reduce cost, size, and/or complexity of the network interface device.

Figure 2:
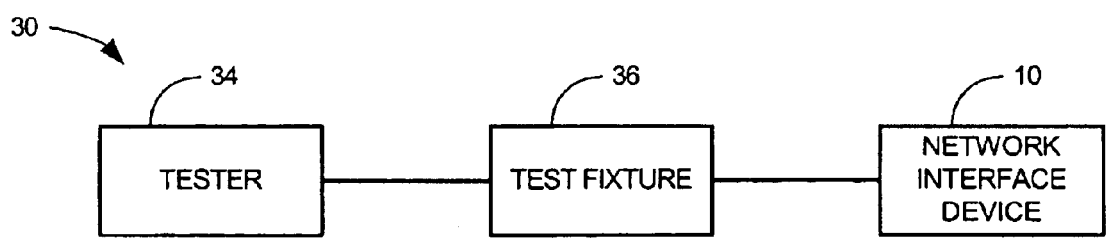
FIG. 2 is a block diagram of a test system for testing a network interface device such as the device of FIG. 1.

Turning now to FIG. 2, a test system 30 is shown for testing the network interface device 10. The network device 10 is operatively coupled to a tester 34 via a test fixture 36, such as a circuit board or test head. The tester 34 may be of a conventional configuration, for example with means for sending and receiving data in order to test various aspects of the operation of the device 10. The test fixture 36 may also be of a conventional configuration, for example with a device-under-test board (DUT board) which receives contacts such as pins of the network device 10, with mechanical and/or pneumatic means for securing the network device to the test fixture, and with means such as spring-loaded probes for electrically connecting the tester 34 to contact points on the DUT board. The contact points are electrically connected to the pins of the device 10. It will be appreciated that a variety of suitable testers and test fixtures are well known in the art.

Figure 3:
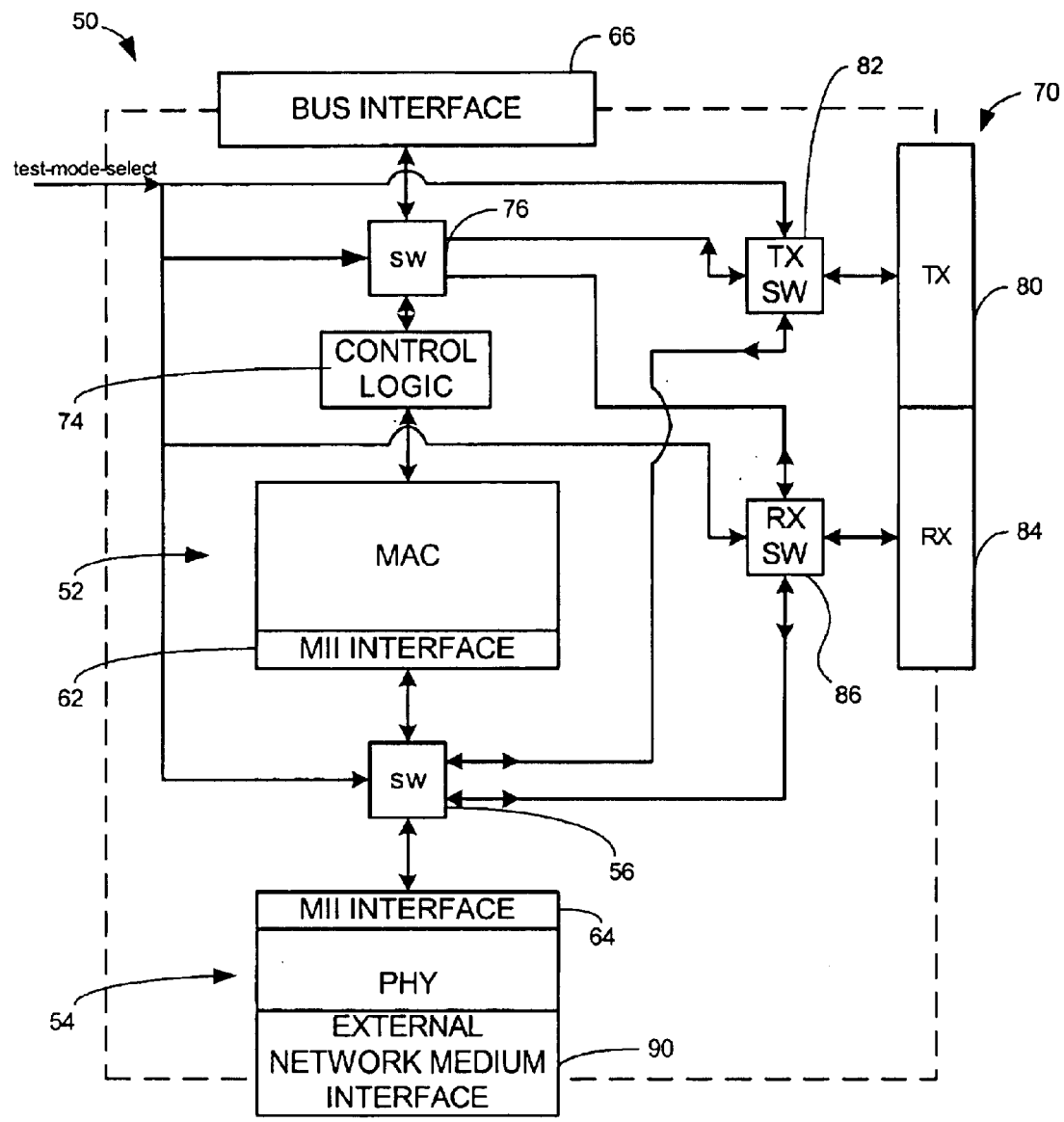
FIG. 3 is a block diagram of a specific embodiment network interface device of the present invention.

FIG. 3 shows a block diagram of a specific network interface device 50. The interface device 50 includes a MAC block 52 which is internally coupled to a PHY block 54 via a MAC-PHY switchable connection 56. The MAC block 52 and the PHY block 54 have respective MII interfaces 62 and 64 to facilitate communication between the MAC block and the PHY block. An exemplary MII specification is described in IEEE standard 802.3u-1995, which is incorporated herein by reference in its entirety. The MAC block 52 includes one or more MACs and other items such as state machines, data registers, etc. The PHY block 54 likewise contains one or more PHYs and other items. In addition the PHY block 54 includes a network medium interface including such items as an analog front end (AFE) and items such as magnetics for sending signals along a network medium.

The network interface device 50 has two external interfaces for interfacing with devices and/or software on higher levels of a network protocol stack. The external interfaces are a bus interface 66 and an external MII interface 70. The bus interface 66 may be an interface such as a peripheral component interconnect (PCI) interface for connecting to a bus of a computer, to allow communication between the network interface device 50 and software drivers installed on the computer. The external MII 70 may be used to connect with a legacy device, such as a legacy MAC, which is in turn coupled to software drivers in communication with application software and/or operating system software. Thus the network interface device 50 may be incorporated as part of a network interface card which includes other PHY devices and/or MAC devices, for example allowing communication via other types of network media and/or via other protocol specifications.

Control logic 74 is used to control communication to and from the network interface device 50 via the external interfaces 66 and 70. The control logic 74 may include means, such as data registers, state machines, FIFOs, etc., for routing data to one or both of the external interfaces 66 and 70, for receiving and manipulating data acquired by the external interfaces, and/or for controlling internal routing of data via an interface switchable connection 76.

Figure 4:
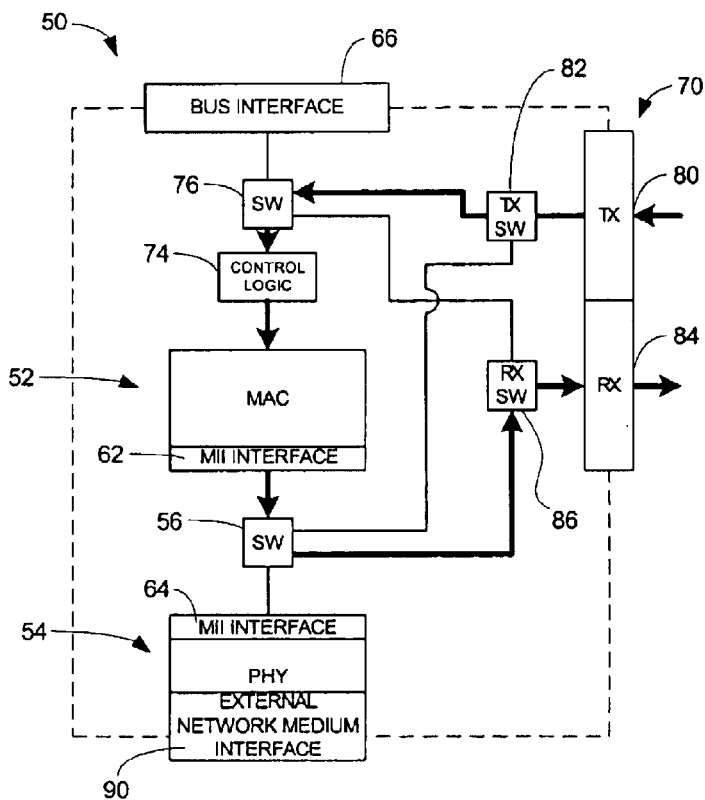
FIGS. 4–9 are block diagrams of the network interface device of FIG. 3 configured in various test modes, for testing individual of the blocks of the network interface device.

The network interface device 50 is configurable to allow testing of the MAC block 52, the PHY block 54, and/or the bus interface 66, via use of the transmit and/or receive pins of the external MII 70. For example, in FIG. 4 the network interface device 50 is configured to test the performance of the MAC block 52 in processing frames, packets, or other data to be transmitted onto a network medium. A transmit (TX) portion 80 of the external MII is operatively coupled to the MAC block 52 via a TX switchable connection 82, the interface TO switchable connection 76, and the control logic 74. Output from the MAC block 52 is routed to a receive (RX) portion 84 of the external MII 70, via the MAC-PHY switchable connection 56 and an RX switchable connection 86. Thus the network interface device 50 may be coupled to a suitable tester and test fixture, with input signals sent via the TX portion 80 of the external MII 70, processed by the MAC block 52, and output from the MAC block routed back to the tester via the RX portion 84 of the external MII. Thus performance of the MAC block 52 may be verified and/or evaluated.

It will be appreciated that switchable connections such as the connection 56, 76, 82, and 86, are well known in the art. Switching of such connections may be accomplished by sending signals to test registers inside the network interface device 50. Alternatively switching may be accomplished by using external pins to put the network interface device 50 into one or more test modes, for example using an external pin or pins to send a test_mode_select signal, as illustrated in FIG. 3. For example, signals to put the network interface device into a test mode may be sent via the external MII 70.

Figure 5:
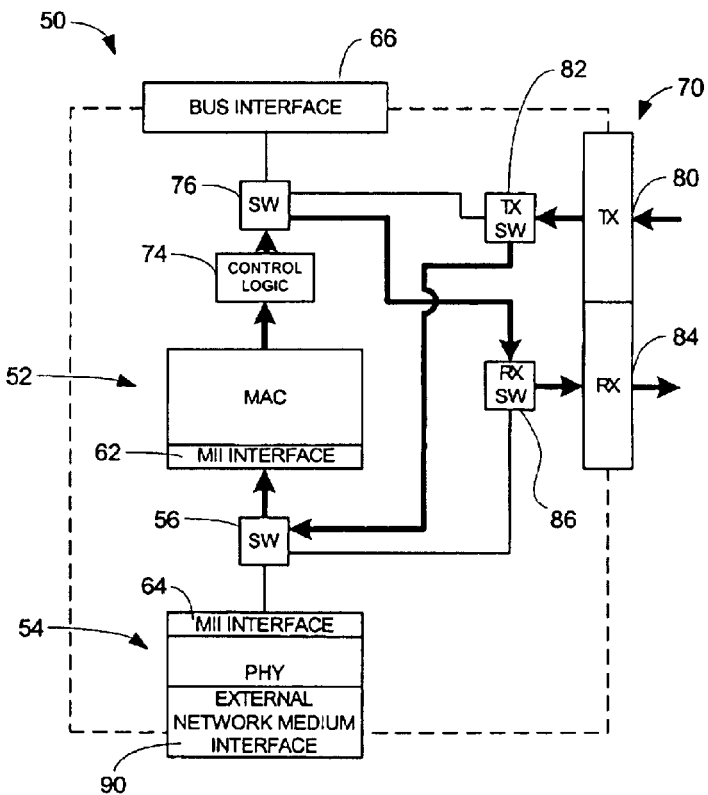

Turning now to FIG. 5, a test mode is shown wherein performance of the MAC block 52 may be evaluated as to processing of signals received from a network medium which would be attached to the network interface device 50.

Figure 6:
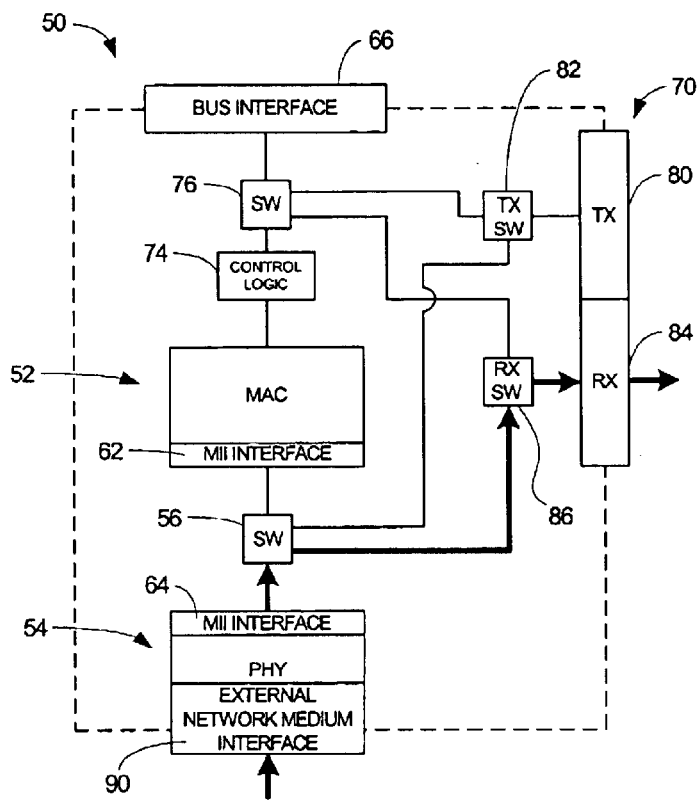
Figure 7:
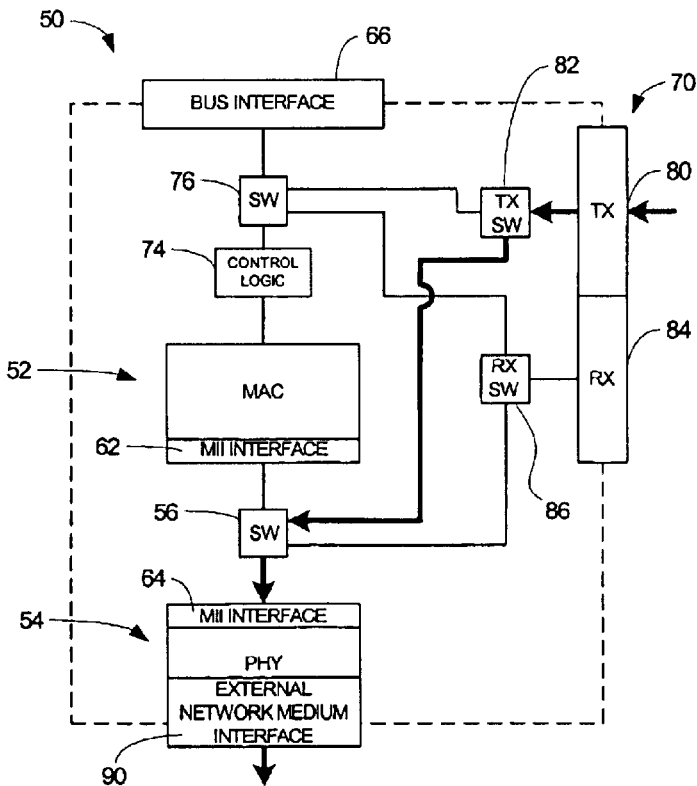

FIGS. 6 and 7 show test mode configurations for testing the PHY block 54 respectively for receive and transmit operations. In the test mode configuration of FIG. 6, output from the PHY MII 64 of the PHY block 54 is routed through the MAC-PHY switchable connection 56 and the PX switchable connection 86, to the RX portion 84 of the external MII 70. A tester may send a test signal via a test interface to an external network medium interface 90 of the PHY block 54. For example, the test signal may include simulated data in a form that would be passed along a network medium. By examining the output from the RX portion 84 of the external MII 70, performance of the PHY block 54 in receiving data from a network medium may be evaluated.

In FIG. 7 transmit operations of the PHY block 54 may be evaluated. Simulated data is sent from a tester through the TX portion 80 of the external MII 70, through the switchable connections 86 and 56, and into the PHY block 54 via the PHY MII 64. Output from the external network medium interface 90 of the PHY block 54 may be recorded and/or evaluated by the tester.

Figure 8:
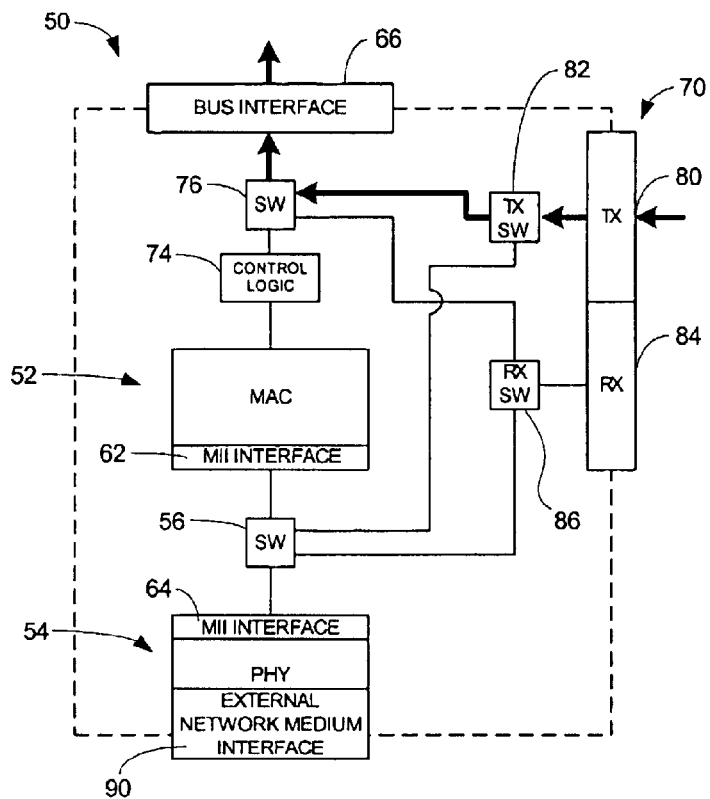
Figure 9:
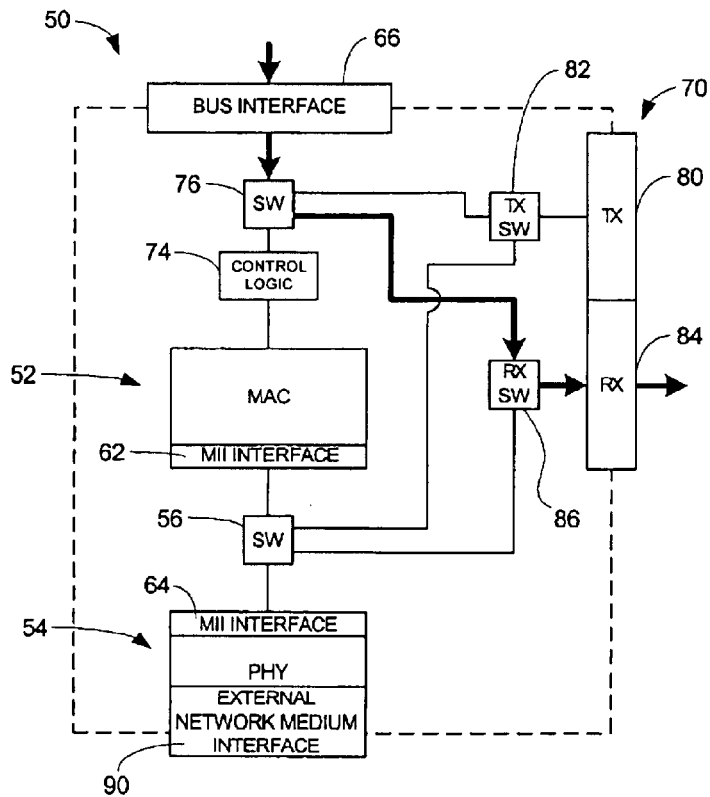

FIGS. 8 and 9 show test modes of the network interface device 50 for testing performance of the bus interface 66. In the test mode of FIG. 8 the bus interface 66 is coupled to the TX portion 80 of the external MII 70, via the switchable connections 82 and 76. Test signals may be input through the TX portion 80 with output from the bus interface 66 received and/or evaluated by a test device. The test mode of FIG. 8 may be used to examine performance of the bus interface 66 during receive operations.

In the test mode of FIG. 9, the bus interface 66 is coupled to the RX portion 84 of the external MII 70, for testing transmit operations through the bus interface. Test signals are input on pins of the bus interface 66, and output from the bus interface is routed through the switchable connections 76 and 86, to the RX portion 84. From the pins of the RX portion 84, the output may be routed to a tester via a test interface. Thus performance of the bus interface 66 may be evaluated for transmit operations (operations where data is to be sent on a network medium).

It will be appreciated that the terms "media independent interface" and "MII", as used herein, are intended to include variations on the standard MII, such variations including the reduced media independent interface (RMII) and the serial media independent interface (SMII). The standard MII has a four-bit wide data stream. The RMII and the SMII have two-bit and one-bit data streams, respectively, but utilize fewer pins than the standard MII.

It will be appreciated that the MAC block 52 may include more than one _MAC and the PHY block 54 may include more than one PHY, if desired. For example, multiple MACs and PHYs may be utilized where the network interface device 50 is used to transmit and receive data in multiple formats. In an exemplary embodiment, the network interface device 50 transmits and receives data along standard telephone lines, in both the home phone networking alliance (HPNA) 1.0 and 2.0 specification formats. The network interface device of such an exemplary embodiment may be included as part of a network interface card which also allows connection to other types of network media. It will be appreciated that MAC blocks containing multiple MACs and PHY blocks containing multiple PHYs may include appropriate additional sub-blocks such as multiplexers and suitable control logic.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A network medium interface for coupling a device to a network medium, the interface comprising:
   a network medium interface card, including
   first and second blocks,
   an external interface for coupling to the network medium, and
   a switchable connection,
   wherein the switchable connection may be selectively configured either to internally connect the blocks to each other, or to connect one of the blocks to a transmit portion and/or a receive portion of the external interface.

2. The card of claim 1, wherein the external interface is a media independent interface (MII).

3. The card of claim 2, wherein the MII transmits and receives data in four-bit wide data stream.

4. The card of claim 1, wherein one of the blocks includes a physical layer device (PHY).

5. The card of claim 1, wherein one of the blocks includes a media access controller (MAC).

6. The card of claim 1, wherein the switchable connection is a first switchable connection, and further comprising a third block and a second switchable connection which may be selectively configured either to internally connect the third block to the first block, or to connect either the first block and/or the third block to the transmit portion and/or the receive portion of the external interface.

7. The card of claim 6, wherein the first block includes a media access controller (MAC).

8. The card of claim 6, wherein the third block includes a bus interface.

9. The card of claim 8, wherein the bus interface is a peripheral component interconnect (PCI) interface.

10. The card of claim 6, wherein the second block includes a physical layer device (PHY).

11. The card of claim 6, when the first and second switches may be configured to test operation of the first block by connecting receive and transmit ends of the first block to respective portions of the external interface.

12. A method of testing operation of an internal block of a network medium interface device, comprising:
   reconfiguring the device so that a normally-internally-connected connection of the block is connected to an external interface;
   inputting test signals to the block; and
   evaluating output of the block.

13. The method of claim 12, wherein the reconfiguring includes connecting two normally-internally-connected connections of the block to the internal interface.

14. The method of claim 12, wherein the reconfiguring includes configuring one or more switchable connections operatively coupled to the block.

15. The method of claim 14, wherein the configuring includes sending signals to the one or more switchable connections.

16. The method of claim 15, wherein the sending signals includes sending the signals through pins of the network medium interface.

17. The method of claim 12, wherein the external interface is a media independent interface (MII).

18. The method of claim 12, wherein the block includes a media access controller (MAC).

19. The method of claim 12, wherein the block includes a physical layer device (PHY).

20. The method of claim 12, wherein the block includes a second external interface.

21. The method of claim 20, wherein the second external interface is a bus connector.

22. A network medium interface device comprising:
   a media access controller (MAC);
   a physical layer device (PHY);
   an external interface; and
   a switchable connection;
   wherein the switchable connection may be selectively configured either to internally connect the MAC to the PHY, or to connect either the MAC or the PHY to a transmit portion and/or a receive portion of the external interface.

23. The device of claim 22, wherein the switchable connection may be configured to test operation of the MAC and/or the PHY by connecting respective receive and transmit ends of to respective portions of the external interface.

24. The device of claim 22, wherein the switchable connection is a first switchable connection, and further comprising a third block and a second switchable connection which may be selectively configured either to internally connect the third block to the MAC, or to connect either the MAC and/or the third block to the transit portion and/or the receive portion of the external interface.

25. The device of claim 24, wherein the third block includes at least one of an additional MAC, an additional PHY and a bus interface.

26. The device of claim 25, wherein the first and second switches may be configured to test operation of the additional MAC by connecting receive and transmit ends of the additional MAC to respective portions of the external interface.

27. The device of claim 25, wherein the first and second switches may be configured to test operation of the additional PHY by connecting receive and transmit ends of the additional PHY to respective portions of the external interface.

28. The device of claim 25, wherein the first and second switches may be configured to test operation of the third block by connecting receive and transmit ends of the third block to respective portions of the external interface.

* * * * *

UNITED STATES PATENT AND TRADEMARK OFFICE
CERTIFICATE OF CORRECTION

PATENT NO. : 6,813,729 B1
DATED : November 2, 2004
INVENTOR(S) : Tsang et al.

It is certified that error appears in the above-identified patent and that said Letters Patent is hereby corrected as shown below:

Column 1,
Line 46, replace "or to more" with -- or more --

Column 2,
Line 6, replace "interface (Mul), the Mul" with -- interface (MII), the MII --

Column 4,
Line 29, replace "interface TO switchable" with -- interface switchable --

Column 6,
Line 1, replace "when" with -- wherein --

Column 8,
Line 6, replace "transit" with -- transmit --

Signed and Sealed this

Eighth Day of February, 2005

JON W. DUDAS
*Director of the United States Patent and Trademark Office*